United States Patent [19]

Adams et al.

[11] 4,303,700

[45] * Dec. 1, 1981

[54] SPRAYABLE MATERIAL FOR REPAIRING BASE PLATES OF INGOT MOLDS

[75] Inventors: Paul G. Adams, Birmingham, Ala.; Kenneth A. Gebler, Munster, Ind.

[73] Assignee: Nalco Chemical Company, Oak Brook, Ill.

[*] Notice: The portion of the term of this patent subsequent to Feb. 12, 1997, has been disclaimed.

[21] Appl. No.: 183,557

[22] Filed: Sep. 2, 1980

Related U.S. Application Data

[63] Continuation of Ser. No. 64,169, Aug. 6, 1979, abandoned, which is a continuation-in-part of Ser. No. 966,679, Dec. 5, 1978, Pat. No. 4,188,416.

[51] Int. Cl.³ .............................................. B26D 7/38
[52] U.S. Cl. ...................................... 427/135; 164/72; 106/38.27
[58] Field of Search ................... 427/135; 106/38.27; 164/72

[56] References Cited

U.S. PATENT DOCUMENTS

| | | | |
|---|---|---|---|
| 2,995,453 | 8/1961 | Noble | 106/38.27 |
| 3,184,815 | 5/1965 | Reuter | 427/135 |
| 3,396,935 | 8/1968 | Snyder | 427/135 |
| 3,509,936 | 5/1970 | Kearfott | 164/72 |
| 3,674,518 | 7/1972 | Vuaroqueaux | 164/72 |
| 3,885,062 | 5/1975 | Bombola | 106/38.27 |

*Primary Examiner*—Sam Silverberg
*Attorney, Agent, or Firm*—John G. Premo; Robert A. Miller

[57] ABSTRACT

The base plates or stools of ingot molds used in the casting and teeming of molten steel can be repaired by spraying onto the ingot mold base plate from 2-5 gallons of a composition comprising:

| | |
|---|---|
| Aluminum silicate refractory-grain [1] | 50–80% |
| $Al_2O_3$ | 4.0–17.0% |
| Bentonite clay | 0.2–5.0% |
| Binder | 4.0–25% |
| 75% phosphoric acid | 72–82% |
| Alumina trihydrate | 6.2–16.2% |
| Powdered boric acid | 1.0–7.0% |
| $H_2O$ | 4.0–14.0% |
| Water | 5–30% |

2 Claims, No Drawings

SPRAYABLE MATERIAL FOR REPAIRING BASE PLATES OF INGOT MOLDS

This application is a Continuation of co-pending application Ser. No. 064,169 filed Aug. 6, 1979 now abandoned, which in turn is a Continuation-In-Part of co-pending application Ser. No. 966,679 filed Dec. 5, 1978, now U.S. Pat. No. 4,188,416.

Ingots are made by casting molten metal into molds. These molds rest on bases commonly known as stools. The stools are merely large, normally rectangular flat slabs of metal commonly made of cast iron which are used as support for the molds sides and also generally form the botton portion of the mold. Various problems commonly occur in the use of these stools and particularly with respect to the surface of the mold stool which is contacted with molten metal.

First, the unprotected metal stool surface quickly erodes and pits in the presence of molten metal which is cascaded upon the surface. Large gouges in the base portions are produced due to the force and high temperature developed by the flowing molten metal which contacts the surface of the stool. Since many molds are generally approximately 5–10 feet in height, the metal must be poured from a height at least equal to that distance and quite often is poured from even greater heights. A considerable pressure head is thereby developed. Thus the hot molten metal easily gouges gaping depressions in the base members under such force and at a temperature of at least the liquefaction temperature of the molten metal. Moreover, the problem of creation of pits or gouges in the base portions of the molds, caused by the above factors is aggravated due to the fact that the molten metal, especially near the bottom of the mold, remains in its erosive hot liquid states for a considerable amount of time subsequent to pouring.

The molten metal upon soldification to an ingot thereby has a bottom form conforming to the undesirable eroded surface configuration of the stool or base member of the mold. Thus, a considerable amount of the ingot, when withdrawn from the mold and subsequently processed into slabs or blooms, is lost through a cropping of the irregularly formed end of the slab. This, of course, is highly undesirable, since it results in undue loss of usable metal and increase in scrap, which must be subsequently reprocessed.

Another extremely serious and costly problem results after the ingot in the mold has solidified to a point where it can be removed from both the mold sides and its base platform member or stool. In many cases, if the surface of the stool is unprotected, or inadequately protected, and erosion occurs as described above, the ingot has a greater tendency to remain tightly adherent to the stool. This condition is commonly called a "sticker." Thus, after the mold sides are removed from around the ingot, the ingot must be forcibly removed from the stool. This is normally achieved by raising both ingot and adherent stool, and thrusting them against some other larger object whereby the ingot is jarred loose. In many cases the stool and ingot are merely dropped on the floor from some suitable height. In such a situation, the stool is often cracked or broken into two or more smaller pieces and cannot be subsequently reused in casting other ingots. Again, replacement cost of these stools is high, making this aspect of the overall casting process somewhat disadvantageous. The same problem exists with respect to big end up molds wherein sticking of ingots particular occurs at their base portion. New molds of this type are especially vulnerable to sticking due to their smooth surface unprotected by any layers of metal oxides or scale. A tight metal-to-metal bond between mold bottoms and ingots then occurs.

Cracking of molds and particularly their base portions due to the above discussed rough handling occasioned by "stickers" between the base portions and ingots is also enhanced by thermal shock during ingot formation. Unprotected or inadequately protected bottom surfaces of mold are especially susceptible to such destructive shock.

Many solutions to alleviating the above described problems in connection with the erosion of base members of ingot molds have been proposed by the prior art. A number of refractory coatings have been suggested but these are not entirely satisfactory.

While refractory stool patches have met with commercial success, these patches are not altogether satisfactory in that after several pourings they may tend to crack or chip allowing molten metal to penetrate. The same is also true with refractory inserts. After the insert has worn, the molten metal flows below or through cracks in the insert and causes non-metallic inclusions in the ingot which necessitate the expensive operation known as "butt cropping."

If it were possible to repair a stool quickly and inexpensively whereby improved life could be achieved, a substantial advance to the arc could be achieved.

OBJECTS

It is therefore an object of this invention to provide to the art a sprayable, pumpable, stool repair refractory.

Another object of this invention is to provide a composition which when applied to stools which may or may not contain refractory patches or inserts, will eliminate non-metallic inclusion in ingots formed utilizing the thus treated stool.

Other objects will appear hereinafter.

THE INVENTION

The composition of this invention comprises five basic ingredients. These ingredients include:
A. an aluminum silicate powder;
B. a powdered alumina;
C. a clay;
D. a refractory binder; and,
E. water.

A. The aluminum silicate refractory grain of this invention comprises between 50–80% by weight of the composition of this invention. Preferably, 55–75% by weight of the composition of this invention and most preferably between 57–70% of this invention.

The aluminum silicate material employed contains at least 40% by weight as $Al_2O_3$ and may contain as much as 70% $Al_2O_3$. Due to cost considerations the aluminum silicate material of this invention generally has a ratio of $Al_2O_3$: $SiO_2$ of 47:53 although as detailed above, this percentage may vary as high as 70:30. The size of the aluminum silicate refractory grain material employed may vary over a wide particle size. While particle size is important in the formulation of a pumpable slurry such as that employed in this invention, materials having a wide range of particle size can be utilized. As such, the aluminum silicate grain may range from 10–400 mesh. In the formulation of this material, however, we have found it advantageous that at least 10% and preferably 10-25% of the aluminum silicate material employed have a mesh size not greater than 200 mesh. The remainder of the aluminum silicate material employed (75-90%) may have a particle size in the 15-30 mesh range, preferably 20 mesh.

B. The alumina powder present in this invention is generally present at a level of 4-17% by weight of the composition. Preferably 6-15% and most preferably 7.5-14% by weight of the composition is composed of a finely divided alumina powder. The particle size of this material may also vary over a wide degree preferably ranging from 200-400 mesh. Most preferably a 325 mesh alumina powder is utilized.

C. The powdered clay utilized in this invention comprises 0.2-5 weight percent of the composition of this invention. Preferably between 0.3-4% of the composition is composed of the clay of this invention. The clay is preferably a bentonite material although other alumina containing clays may be utilized. The particle size of the clays employed may range from 200-400 mesh and is preferably around 325 mesh.

D. The refractory binder utilized in the composition of the instant invention is an aluminum phosphate-phosphoric acid type material. Broadly speaking the refractory binder employed will contain from 70-85% by weight of 75% phosphoric acid, 5-20% alumina trihydrate, 1-7% boric acid and 2-18% water.

In a preferred embodiment of this invention the binder will contain 72-82% of a 75% phosphoric acid, 6.2-16.2% alumina trihydrate, 1-7% boric acid, and 4-14% water. Most preferably the binder will contain 77.0% of a 75% phosphoric acid, 11.2% alumina trihydrate, 2.35% powdered boric acid and 9.45% water.

E. The amount of water present in the composition of this invention can vary substantially. Not including water present in the refractory binder, from 5-30% water may be present. Preferably 7-25% and most preferably 8-20% by weight of the composition is water.

While percentages can vary from what is given above, it is important that the material be thixotropic, allowing for the material to be sprayed upon a warm or hot ingot mold stool.

EXAMPLE

A composition was prepared containing the following ingredients:

| | | |
|---|---|---|
| Less than 20 mesh aluminum silicate refractory grain[1] | 49.5% | |
| Less than 200 mesh aluminum silicate refractory grain[1] | 11.56% | |
| Less than 325 mesh Al$_2$O$_3$ | 13.21% | |
| Less than 325 mesh bentonite clay | 1.75% | |
| Binder - 75% phosphoric acid | 77.0% | |
| Alumina trihydrate | 11.2% | |
| Powdered boric acid | 2.35% | |
| H$_2$O | 9.45% | |
| | 100.00% | 11.99% |
| Water | | 11.99% |
| | | 100.00% |

[1]Contains approximately 47% as Al$_2$O$_3$

USE OF THE COMPOSITION OF THE INVENTION

The composition described above is fluid and may be pumped utilizing a diaphram pump through a small i.d. hose. One of the criteria of the composition of this invention is that it must be pumpable through a 1" i.d. hose having a length of 75 feet. This is critical in the fact that the hose must be able to adequately handled by one individual.

In a field trial of the instant invention, ingot molds which had been patched using a high alumina refractory were repaired by spraying onto the stool 2-5 gallons of the composition described above. Spraying was accomplished utilizing a diaphram pump which pumped the material through a 1" i.d. hose having a length of 75 feet. The material flowed onto the stool easily, was self-leveling and adequately filled cracks and broken edges in this stool patch. Residual heat contained in the stool was sufficient to dry and cure the material to provide a strong crack free patch.

The composition of this invention may also be used on stool which have placed therein refractory inserts. In this case, the composition of the instant invention fills cracks, depressions and the edges between the refractory insert and the stool thus preventing molten metal from flowing between the stool and the insert.

The composition and method of this invention substantially reduced the non-metallic inclusions in the ingot being formed using stools so treated.

We claim:
1. A process for repairing ingot mold stools which comprises:
   (1) forming a thixotropic, self-leveling stool repair material comprising:
      (a) 50-80% by weight powdered aluminum silicate, said silicate having the following particle size distribution:
         10-25% not greater than 200 mesh
         75-90% 15-30 mesh
      (b) 4-17% by weight powdered alumina of from 200-400 mesh
      (c) 0.2-5.0% bentonite clay of from 200-400 mesh
      (d) 4.0-25% of a binder having a composition comprising:
         75% phosphoric acid—72-82%
         alumina trihydrate—6.2-16.2%
         powdered boric acid—1.0-7.0%; and
         water—4.0-14.0%
      (e) 5.0-30% water
   (2) pumping said stool repair material onto an ingot mold stool, said stool having been previously damaged by molten metal;
   (3) allowing said composition to cure, utilizing the residual heat contained in said ingot mold stool; and then,
   (4) recovering a repaired ingot mold stool having a strong, crack-free patch.
2. An ingot mold stool repair composition comprising:
   (1) 50-80% powdered aluminum silicate refractory grain having the following particle size distribution:
      10-25% not greater than 200 mesh
      75-90% 15-30 mesh
   (2) 4-17% by weight powdered alumina of from 200-400 mesh
   (3) 0.2-5.0% bentonite clay of from 200-400 mesh
   (4) 4.0-25% of a binder having a composition comprising:
      (a) 75% phosphoric acid—72-82%
      (b) alumina trihydrate—6.2-16.2%
      (c) powdered boric acid—1.0-7.0%; and,
      (d) water—4.0-14.0%
   (5) 5.0-30% water
   said composition being thixotrophic and sprayable through a 1" i.d. hose having a length of 75 feet.

* * * * *